Sept. 29, 1970  G. W. KELLY  3,530,706
SHOCK ABSORBER TESTING APPARATUS
Filed Jan. 22, 1969  3 Sheets-Sheet 1

INVENTOR.
GERALD W. KELLY
BY
Learman + McCulloch

INVENTOR.
GERALD W. KELLY
BY
Leaman & McCulloch

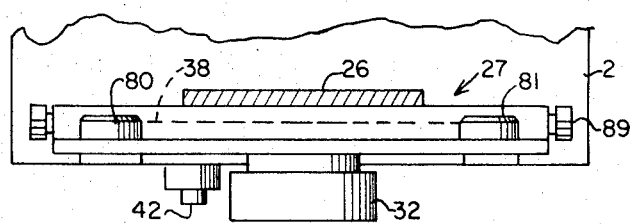
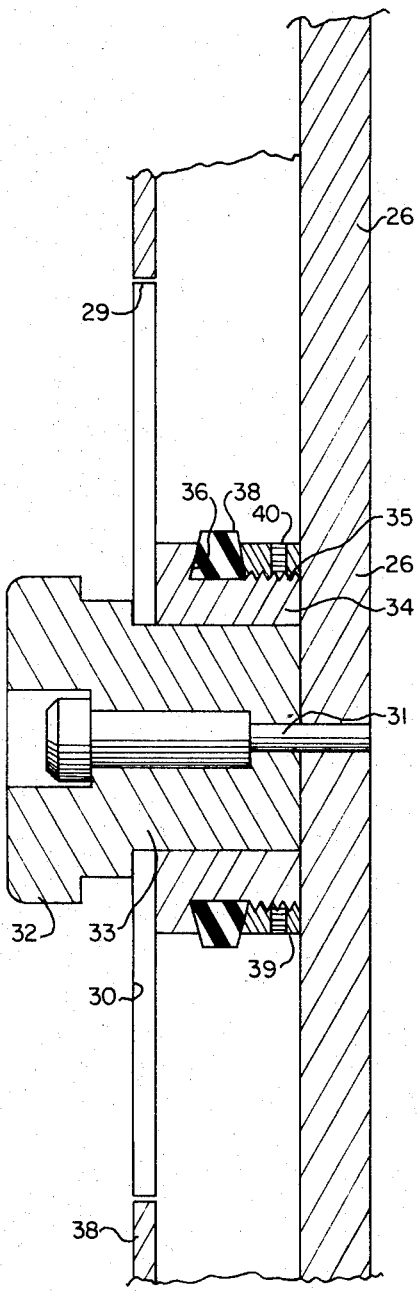
FIG. 4
FIG. 5
INVENTOR.
GERALD W. KELLY

United States Patent Office 3,530,706
Patented Sept. 29, 1970

1

3,530,706
SHOCK ABSORBER TESTING APPARATUS
Gerald W. Kelly, Bridgeport, Mich., assignor to Wilson Engineering, Inc., Saginaw, Mich., a corporation of Michigan
Continuation-in-part of application Ser. No. 643,646, June 5, 1967. This application Jan. 22, 1969, Ser. No. 793,023
Int. Cl. G01m 17/04
U.S. Cl. 73—11                                    15 Claims

ABSTRACT OF THE DISCLOSURE

Testing apparatus for a shock absorber device or the like having a support reciprocable in a cylinder and a rotary scale operable to indicate the accumulative travel of the support in both directions of its travel for providing a measure of the efficiency of a device under test. The cylinder is equipped with a rapid exhaust mechanism for enabling substantially instantaneous exhaust of fluid from the cylinder to avoid the imposition of any fluid force in opposition to the movement of the support. A resilient friction clutch mechanism couples the support and the rotary scale to rotate the latter in one direction only and without any slippage. Adjusting means is provided to compensate for wear of the clutch.

This application is a continuation-in-part of application Ser. No. 643,646, filed June 5, 1967, now Pat. No. 3,427,860.

The invention disclosed herein relates to apparatus for testing reciprocable devices and more particularly for testing the effectiveness of devices such as vehicle shock absorbers while they are mounted on the vehicle. Such testing of shock absorbers provides a much more accurate indication of the efficiency of the shock absorbers than can be obtained by testing them when disconnected from the vehicle. In addition, it is a time consuming and troublesome task to disconnect shock absorbers from a vehicle, test them, and reinstall them if they are satisfactory.

Apparatus constructed in accordance with the invention provides for the testing in an identical manner of each shock absorber with which a vehicle is equipped, thereby enabling the effectiveness of each such shock absorber to be ascertained and compared with shock absorber standards. This is accomplished by the initial location of a vehicle supporting, reciprocable member in a precisely determined location prior to testing each shock absorber, adjusting an indicating mechanism to an initial position, and suddenly removing the support for the reciprocable member, thereby enabling the weight of the vehicle to initiate reciprocation of the support member in accordance with the rebounding of the vehicle body. The number of rebounds will be inversely proportional to the effectiveness of the shock absorbers. The arrangement is such that the vehicle support member moves in opposite directions with the vehicle body and the movement of the support member in each direction effects accumulative operation of the indicating mechanism, thereby providing an indication of the total travel of the support mechanism. The total travel of the support mechanism member thus is directly proportional to the number of rebounds of the vehicle body.

A principal object of the invention is to provide improved apparatus for effectively testing vehicle shock absorbers without necessitating removal of the shock absorbers from the vehicle.

Another object of the invention is to provide apparatus of the character described which has a uniform initial testing position under all conditions of operation, thereby enabling accurate test data to be compiled.

2

A further object of the invention is to provide shock absorber testing apparatus which is portable, easy to use and relatively inexpensive to manufacture.

Another object of the invention is to provide testing apparatus having a reciprocable member and a rotary indicator for indicating the total travel in both directions of the reciprocable member and including an improved, non-slip friction clutch mechanism for converting movement of the reciprocable member to rotary movement of the rotary indicator.

A further object of the invention is to provide testing apparatus of the kind referred to and wherein means is provided for compensating for wear of the clutch mechanism.

Other objects and advantages of the invention will be pointed out specifically or will become apparent from the following description when it is considered in conjunction with the appended claims and the accompanying drawings, in which:

FIG. 4 is a sectional view taken on the line 4—4 of FIG. 1; and

FIG. 5 is an enlarged, sectional view taken on the line 5—5 of FIG. 1.

Figures 1, 2:
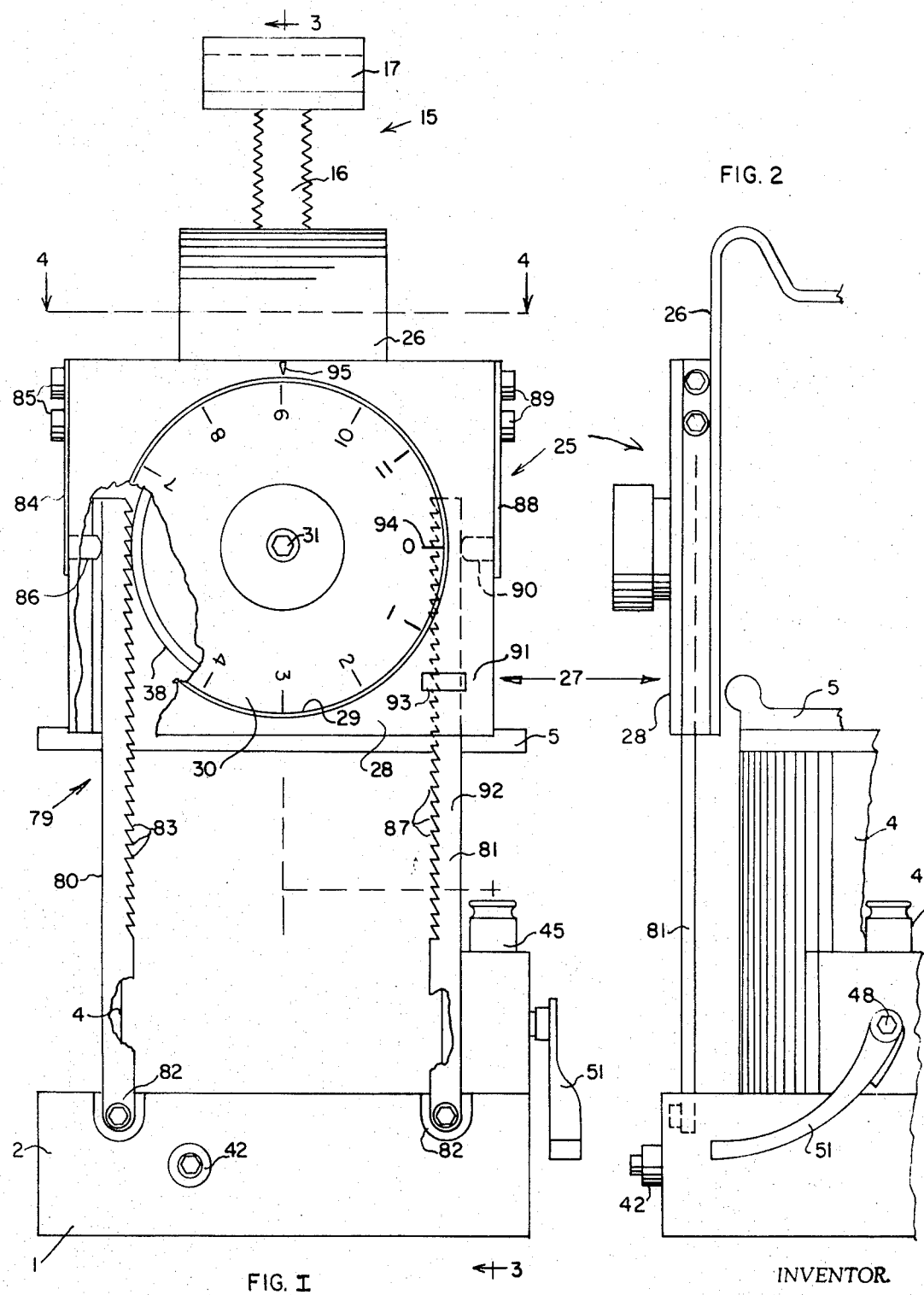
FIG. 1 is a front elevational view of shock absorber testing apparatus constructed in accordance with the invention, certain parts being broken away for purposes of illustration.
FIG. 2 is a fragmentary, side elevational view.
Figure 3:
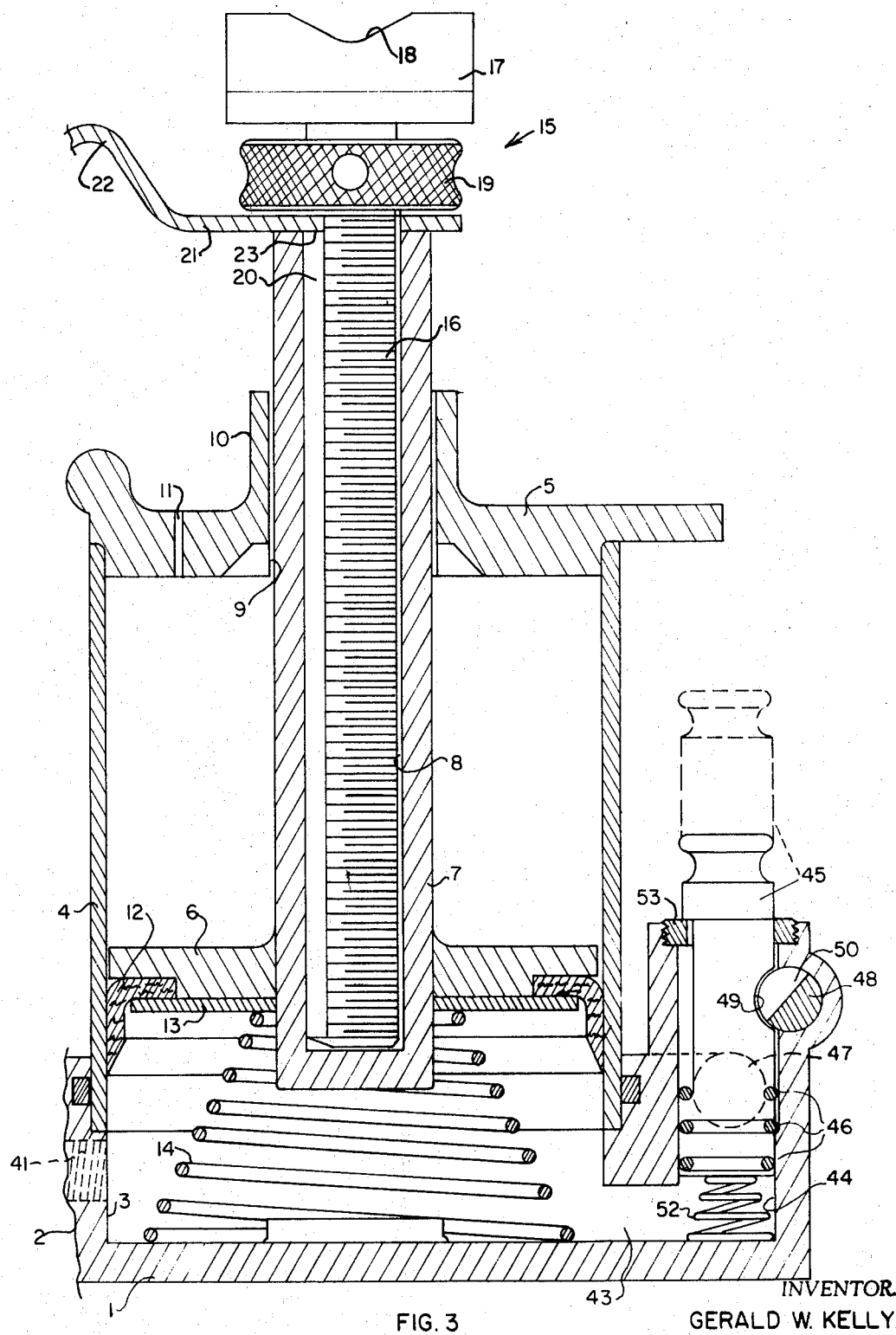
FIG. 3 is a vertical sectional view taken on the line 3—3 of FIG. 1.

Apparatus constructed in accordance with the disclosed embodiment comprises a base 1 having a generally cup-shaped housing member 2 defining an annular chamber 3 in which is fixed a cylinder 4 that is closed at its upper end by a cap 5. Within the cylinder 4 is a reciprocable piston 6 that is secured to an upstanding piston rod 7 having a smooth, blind bore 8 formed therein. The piston rod passes through an opening 9 in the cap 5 and is guided in its movements by a tubular boss 10 forming part of the cap. The cap is vented by one or more passages 11.

On the lower or inner face of the piston 6 is fitted a leather or other suitable washer 12 which is maintained assembled with the piston by means of an annular disc 13 that is fixed to the piston by rivets (not shown) or the like. Between the piston 6 and the bottom 2 is a conical spring 14. The spring 14 functions to urge the piston and the piston rod 7 toward the end cap 5.

A support or standard 15 is carried by the piston and piston rod assembly and comprises a threaded shaft 16 that is accommodated within the bore 8 and which terminates at its upper end in a support block 17 in which there is a groove 18. Threaded onto the shaft 16 is a knurled nut 19 which may be rotated in one direction or the other so as to cause the shaft 16 to be extended or retracted relatively to the bore 8. The shaft 16 has a flattened surface 20 and passes through a flange 21 of a carrier plate 22 having a flat side 23 which cooperates with the surface 20 to prevent rotation of the shaft 16.

Indicating apparatus operable to indicate the accumulative vertical travel of the standard 15 is designated generally by the reference character 25. The indicating apparatus is carried by a vertical flange 26 of the member 22 and comprises a hollow housing 27 that is welded or otherwise fixed to the flange 26 of the carrier 22 and has a front plate 28 which is provided with an opening 29. Rotatably mounted in the opening is an indicator dial member 30 which is journaled on a shaft 31 that may be fixed to the flange 26. An adjusting knob 32 has a hub 33 which is secured to the dial 30 and extends through the latter. Fixed to the hub for rotation therewith is collar 34 having a reduced diameter, exteriorly threaded hub portion 35 forming a shoulder 36. On the hub portion 35 is mounted an endless clutch ring 38 composed of a highly frictional, tough, durable deformable, but relatively incompressible material such as polyurethane. The inside diameter of the ring 38 corresponds to the diameter of the hub portion 35. Threaded on the collar 34 is an adjusting ring 39 which bears against the clutch ring 38 and maintains the latter snugly against the shoulder 36. The ring 39 constitutes an adjusting device to compensate for wear of the ring 38 as will be pointed out in more detail hereinafter, and it may be maintained in any selected position longitudinally of the hub by means of a set screw 40.

In communication with the chamber 3 is a passage 41 in which is secured a fitting 42 that is adapted for connection to a source of pressure fluid such as compressed air. Also in communication with the chamber 3 is a passage 43 which leads to a valve chamber 44 in which is mounted a vertically reciprocable, rapidly acting, generally spool shaped valve 45 which is provided at its inner end with sealing rings 46. In communication with the chamber 44 is an exhaust port 47 through which fluid from the chamber 3 quickly may be exhausted under the control of the valve 45. Means for controlling the valve 45 comprises a manually rotatable latch or key 48 of generally cylindrical configuration and which is adapted to fit into a groove 49 formed in the body of the valve 45 so as to lock the latter in a position in which the exhaust port 47 is closed. The latch 48, however, has a groove or relieved portion 50 therein which, upon rotation of the latch counterclockwise from the position shown in FIG. 2, enables the valve 45 to move upwardly to the dotted line position and uncover the exhaust port 47 so as to establish communication between the latter and the chamber 3. The movements of the latch 48 are controlled by an operating lever 51 that is fixed to the latch 48.

A spring 52 constantly acts on the valve 45 and urges the latter upwardly to a position in which the passage 47 is open. A retaining ring 53 prevents inadvertent removal of the valve 45 from the chamber 44.

The construction and arrangement of the parts thus far described are such that the base 1 may be positioned adjacent any one of the four wheels of a vehicle and the adjusting nut 19 manipulated to enable the block 17 to bear against the bumper or some other part of the vehicle's body. The standard 15 then is adjusted to a predetermined, initial position with respect to the cylinder 4 in a manner presently to be explained. The valve 45 then may be locked in its closed position and compressed air introduced to the chamber 3 via the fitting 42. The piston 6 and the standard 15 will be displaced vertically so as to elevate the vehicle body a predetermined distance as hereinafter will be described. The latch 48 then may be rotated by the lever 51 so as to unlock the valve 45. The pressure fluid, together with the spring 52, will move the valve 45 rapidly to its open position whereupon the pressure fluid in the chamber 3 will be exhausted substantially instantaneously through the port 47, thereby enabling the weight of the vehicle to move the piston 6 downwardly and compress the spring 14. As the vehicle body moves downwardly, its suspension spring (not shown) also will be compressed or stressed and will cause the body to rebound or ocillate vertically. The amplitude and number or rebounds of the vehicle body will be determined by the efficiency of its shock absorber.

Actuating mechanism 79 for actuating the indicating means 25 comprises a pair of upstanding rack bars 80 and 81 pivotally mounted at their lower ends by bolts 82 on the member 2. The bar 80 extends into the housing 27 and is provided with operating ratchet teeth 83 which confront the clutch ring 38. The bar 80 is urged yieldably toward the clutch ring by a leaf spring 84 that is secured at one end to the housing 27 by screws 85 and which has at its other end a post 86 which extends through an opening in the housing 27 and engages the bar 80. The bar 81 has operating ratchet teeth 87 which confront the clutch ring 38 and is urged yieldably into engagement with the clutch ring by a leaf spring 88 anchored at one end by screws 89 and having a post 90 at its other end in engagement with the bar 81. As is illustrated in FIG. 1, the teeth 83 and 87 are inclined in opposite directions, thereby enabling the dial 30 to be rotated freely in a counterclockwise direction, but preventing clockwise rotation of the dial relative to the actuator bars 80 and 81.

To condition the apparatus for operation, the valve 45 is opened and the standard 15 is adjusted by manipulation of the nut 19 so as to enable the bumper or other part of the vehicle body to be accommodated in the groove 18 of the block 17. The nut then is manipulated to locate the standard 15 and the piston 6 in a predetermined position relative to the cylinder 4. This position may be determined by reference to a mark 91 on the plate 28 and a mark 92 on the bar 81 which is visible through a window 93 in the plate 28. The valve 45 is then closed. Thereafter, the standard is elevated a selected distance, such as three inches, by the introduction of pressure fluid to the chamber 3 so as to elevate the vehicle body to an initial position. When the standard has been raised to its initial position the dial 30 should be rotated counterclockwise to locate a zero or initial position index mark 94 in such position with respect to a reference mark 95 on the plate 28 as to correspond to the vertical displacement of the standard from its initial position. Thus, if the standard is displaced three inches, the dial should be so adjusted that the zero index 94 is offset from the reference 95 an amount corresponding to three inches. This relationship is illustrated in FIG. 1.

Following adjustment of the dial 30, the valve 45 may be opened by rotation of the latch 48 to permit substantially instantaneous exhausting of the fluid from the cylinder 4 whereupon the weight of the vehicle will cause the standard and the housing 27 to move downwardly. As the housing 27 moves downwardly, the teeth 87 on the bar 81 will bear against the ring 38 and effect counterclockwise rotation of the dial 30, the teeth 83 on the bar 80 permitting rotation of the clutch ring relative thereto due to the inclination of the teeth 83 and the resilience of the spring 84. When the standard reaches its initial position, the dial 30 will have been rotated to a position in which the zero index 94 is opposite the reference 95.

The downward momentum of the vehicle will cause the standard to move downwardly past the initial position, accompanied by counterclockwise rotation of the dial 30, such rotation being imparted to the dial by the engagement of the teeth 87 with the clutch ring 38. As the standard reaches its lowest position, the vehicle suspension springs will cause the vehicle body to rebound upwardly. The standard will be raised by the spring 14 so as to remain in contact with the vehicle, whereupon the teeth 83 and the clutch ring 38 will react to impart further counterclockwise rotation to the dial 30. In this instance, the teeth 87 will be disabled due to their inclination and the resilience of the spring 88. The ring 38 and the toothed bars 80 and 81 thus can be considered unidirectional clutch means for effecting unidirectional rotation of the indicator dial 30 in response to movement of the standard 15 in either of its two opposite directions of movement.

Continued rebounding of the vehicle body will effect continued counterclockwise movement of the dial 30 so as to enable the extent of its rotation to be determined by reference to the indicia on the dial 30 and the mark 95. The amount of rotation of the dial 30 represents the accumulated travel of the standard 15 in both of its directions of movement and can be compared to data obtained from the testing of a new shock absorber, thereby enabling the efficiency of the shock absorber under test to be determined.

The use of the smooth friction clutch ring 38 results in greater accuracy of measurement of the total travel of the standard than would be possible with the use of a toothed disc the teeth of which mesh with the actuating teeth 83 and 87. This is because each actuating tooth has some length, all of which must be traversed by the engaged teeth on such a disc before another disc tooth can engage an actuator tooth. If the amount of movement in one direction or the other of the standard is slightly short of a tooth length, there will be no rotation of the indicator dial. Thus, a highly accurate measurement is not possible. In the present construction, however, there are no teeth on the ring 38 and rotation of the indicator dial is not dependent on interengaging teeth.

Although the material from which the clutch ring 38 is made extremely tough and durable, usage of the testing apparatus over a long period of time may cause the ring to be eroded to such an extent that the diameter of the ring will be reduced by such an amount as to introduce inaccuracies in the indicator mechanism 25. When this occurs, the wear compensating ring 39 may be turned toward the dial 30 so as to compress the ring 38 between itself and the shoulder 36. Inasmuch as the material from which the ring is made is deformable, but relatively incompressible, and inasmuch as the inner periphery of the ring 38 is seated on the outer surface of the collar 34, compression of the clutch ring 38 will cause the latter to expand radially, thereby increasing its diameter so as to enable it to assume the proper relationship with reference to the actuating bars 80 and 81.

The disclosed embodiment is representative of the presently preferred form of the invention, but is intended to be illustrative rather than definitive thereof. The invention is defined in the claims.

I claim:
1. Apparatus for testing shock absorbers or the like, said apparatus comprising a base member; a standard member; means mounting said standard member on said base member for reciprocating movement in each of two opposite directions; rotatable indicator means carried by one of said members; and unidirectional clutch means interconnecting said indicator means and the other of said members for rotating said indicator means in one direction only in response to movement of said standard member in either of its directions of movement, said clutch means including an endless, frictional ring.

2. The apparatus set forth in claim 1 wherein said ring is composed of deformable, relatively incompressible material.

3. The apparatus set forth in claim 1 including adjusting means for adjusting the diameter of said ring.

4. The apparatus set forth in claim 1 wherein said clutch means includes toothed actuator means carried by said one of said members and in engagement with said ring.

5. The aparatus set forth in claim 4 including yieldable means uring said actuator means towards said ring.

6. The apparatus set forth in claim 1 wherein said clutch means includes a pair of toothed actuator bars carried by said one of said members straddling said indicator means and in engagement with said ring, the teeth of said bars being inclined in opposite directions.

7. Shock absorber testing apparatus comprising a cylinder member; piston reciprocable in said cylinder member; a standard member carried by said piston for reciprocation therewith; indicator means for indicating the accumulative travel of said standard member in both directions of its reciprocation; actuator means carried by said cylinder member; unidirectional friction clutch means interconnecting said actuator means and said indicator means for operating the latter in response to movement of said standard member in each direction of its reciprocation; pressure fluid inlet means in said cylinder member for introducing thereto pressure fluid to effect displacement in one direction of said standard member; means for exhausting pressure fluid from said cylinder member; and spring means acting between said cylinder member and said standard member and urging the latter in said one direction.

8. The apparatus set forth in claim 7 wherein said exhausting means comprises an opening in said cylinder means; valve means movable from a first position in which said opening is closed to a second position in which said opening is open; latch means for releasably latching said valve means in said first position; and latch release means for releasing said latch means whereby said valve means is enabled to move to its second position.

9. The apparatus set forth in claim 8 including spring means acting on said valve means and urging the latter toward said second position.

10. The apparatus set forth in claim 8 wherein said valve means has a groove therein and wherein said latch means comprises a part removably accommodated in said groove.

11. The apparatus set forth in claim 10 wherein said part has a relieved portion movable into and out of registration with said groove.

12. The apparatus set forth in claim 10 wherein said part is rotatable and including means external of said cylinder member and connected to said part for rotating the latter.

13. Testing apparatus comprising a first member; a second member; means mounting one of said members for reciprocating movements in opposite directions relative to the other member; rotatable means journaled on one of said members; an endless, frictional ring carried by said rotatable means; and toothed actuating means carried by the other of said members and in engagement with said ring for rotating the latter and said rotatable member in a single direction in response to movement of said one of said members in either direction of its movement.

14. Apparatus as set forth in claim 13 wherein said actuating means comprises a pair of bars straddling said ring, the teeth of said bars being inclined in opposite directions.

15. Apparatus as set forth in claim 13 including adjusting means for varying the diameter of said ring.

References Cited

UNITED STATES PATENTS

| | | | |
|---|---|---|---|
| 3,164,003 | 1/1965 | MacMillan | 73—11 |
| 3,187,554 | 6/1965 | Lackman | 73—11 |
| 3,313,142 | 4/1967 | Lackman | 73—11 |

FOREIGN PATENTS 1,189,256  3/1959  France.

CHARLES A. RUEHL, Primary Examiner

U.S. Cl. X.R.

74—31